2,878,259

REACTION OF ACETYLENE WITH SUBSTITUTED-BENZENES IN THE PRESENCE OF A SULFURIC ACID-COLLOIDAL METALLIC MERCURY CATALYST

Edwin M. Smolin, Stamford, Conn., assignor to American Cyanamid Company, New York, N. Y., a corporation of Maine No Drawing. Application May 18, 1956
Serial No. 585,632

3 Claims. (Cl. 260—668)

This invention relates to the process of producing unsymmetrical diarylethanes. More particularly, the invention relates to the production of 1,1-diarylethanes by the condensation reaction of acetylene with the mono- or di-alkyl substituted benzenes.

Heretofore, the syntheses of 1,1-diarylethanes from the condensation reactions of acetylene with mono- and di-alkyl substituted benzenes have been conducted in the presence of a salt catalyst, generally a mercury salt in the presence of sulfuric acid. Ordinarily in carrying out the condensation of toluene with acetylene in the presence of sulfuric acid mercury salt catalysts, the mercury is recovered at the end of the reaction in the form of metallic mercury. This must then be reprocessed in equipment not otherwise needed in order to convert it again into the usable form of a mercury salt, which is then re-used in the process. I have now discovered that metallic mercury which is less expensive may be used directly. Thus the reconversion of the mercury catalyst is avoided. This is accomplished by using a metallic dispersion and redispersing the mercury metal directly recovered from the process. The result is that a single form of mercury rather than two forms must be handled and the added expense and steps required in converting and using mercury salts is avoided. By practicing the invention, a colloidal dispersion of metallic mercury may be employed as a catalyst in the preparation of diarylethane by the condensation of acetylene and mono- or di-alkyl substituted benzenes.

It is thus an object of the present invention to provide a diarylethane synthesis process which permits the use of metallic mercury without suffering disadvantage in yields or in an increase in undesirable by-product formation. A further object of my invention is the production of diarylethanes, wherein the yields obtained are greater than 75% of the theoretical, based on the amount of acetylene and substituted benzenes reacted.

In carrying out the process of my invention, mercury is finely dispersed in a suitable manner, such as by treating in a supersonic vibrator; the desired amount of substituted benzene is placed in a suitable reaction vessel and cooled to about 5° C. below the desired reaction temperature, and while stirring, the sulfuric acid and mercury dispersion is added. Reactions may be carried out at a temperature from about —20° C. to about 70° C. Stirring of the mixture is maintained throughout the reaction to emulsify the acid and the hydrocarbons and to prevent catalyst deposition at the bottom of the reactor. The measured amount of acetylene is then introduced into the reactor over the period necessary to introduce the desired calculated amount. After the acetylene addition is complete, the stirring of the reaction mixture is discontinued, the reaction mixture is separated and the 1,1-diarylethane recovered therefrom. When the reaction is carried out at below 0° C., the reaction mixture is more difficult to work up and the separation of the acid layer from the desired product layer is slower. Therefore, it is preferred that a temperature range of from about 0° C. to 40° C. be employed in the process.

In order that those skilled in the art may more fully understand the discovery herein presented, the following examples are given by way of illustration and not limitation, unless otherwise noted in the appended claims. The examples presented are in connection with the liquid phase synthesis of 1,1-ditolylethane from toluene and acetylene in the presence of sulfuric acid-metallic mercury dispersion as catalyst but other substituted benzenes may be employed according to the teachings of the invention. All parts are parts by weight.

Example 1

To 73.6 parts of 95.4% sulfuric acid is added 0.2 parts of metallic mercury. The mixture is subjected to the action of a supersonic vibrator whereby the mercury disperses to form an unstable colloid. The colloidal dispersion is added to 368 parts of toluene in a 3-neck creased vessel immersed in an ice water bath for cooling. To the resulting mixture is added 15.6 parts of acetylene gas at a uniform rate with good stirring over a period of 40 minutes, keeping the reaction temperature between 6° C. and 8° C. At the end of this time, the reaction mixture is allowed to separate into layers and the organic layer washed with caustic soda, then water and distilled. 87.2 parts of 1,1-ditolylethane (B. P. 150°/10 mm.) corresponding to a yield based on toluene used up of 87.2% and to a conversion of 23.8% of the toluene charged is obtained.

Example 2

The procedure as in Example 1 is repeated using 78.2 parts of sulfuric acid containing 0.22 part of colloidal mercury. The reaction mixture contains 95.3 parts of 1,1-ditolylethane after distillation. The yield of 1,1-ditolylethane based on toluene used up is 96% and the conversion of toluene is 22%.

Example 3

To a well-stirred mixture of 1288 parts of toluene and 175 parts of 95.5% sulfuric acid in a 3-neck vessel cooled in an ice water bath is added 3.0 parts of metallic mercury, dropping the mercury slowly on the high speed shear-action stirrer for maximum dispersion. Then 54.6 parts of acetylene gas are added over a period of 70 minutes, keeping the reaction temperature at 7° C.–8° C. At the end of this time, acetylene addition is discontinued and the reaction mixture worked up as described under Example 1. Upon distillation, essentially all of the toluene is recovered and no 1,1-ditolylethane is found.

It will be apparent from a comparison of Examples 1 and 2 with Example 3 that unless the mercury is dispersed to a colloidal state, it is ineffective for catalyzing the condensation reaction of toluene with acetylene, for example.

The process of the invention may be carried out in either a batch or multi-stage continuous operation. We have found that the average concentration of 1,1-diarylethane present during the course of the reaction product will determine the percent yield of the diarylethane reaction. It is apparent that 100% or theoretical conversion of the substituted benzene to diarylethane per pass could be realized. However, when greater than 45% of the substituted benzene is converted to diarylethane per pass, undesirable side reactions occur which decrease the ultimate yield of diarylethane. Accordingly, by controlling the conversion of substituted benzene to diarylethane in the reaction mixture obtained, increased yields may be realized and avoidance of deleterious side reactions is possible. The procedure for the introduction of reactants at a rate so that from about 15% to about 45% of the stoichiometric amount of acetylene theoretically required to react with all of the substituted benzene charged into the reactor is described in more detail in U. S. Patent 2,734,928 of E. M. Smolin. When the reactants fall outside this range, the yield is substantially diminished, i. e., as the stoichiometric amount of acetylene used decreases, the process becomes progressively impractical and where more than 45% is employed, the by-product formation increases at the expense of yield.

Sulfuric acid of concentrations of from about 85% to about 105%, preferably from about 88% to about 98.5%, may be employed in the present process. The amount of sulfuric acid that is used in the process may vary over rather wide limits, for example, from about one part of sulfuric acid per part of substituted benzene charged to about one part of sulfuric acid to about 25 parts of substituted benzene charged. However, it is preferred that from about 1:12 to about 1:5 parts of sulfuric acid be employed per part of substituted benzene. The colloidal or fine dispersion of metallic mercury may be dispersed in the sulfuric that is introduced into the reaction mixture, or the dispersion may be separately introduced into the reaction mixture. Other methods of introduction of the catalyst into the reaction mixture will be apparent to those skilled in the art. The total amount of the finely dispersed mercury employed in the instant process may vary over fairly wide limits, from about 1:2500 to about 1:150 parts of metallic mercury per part of concentrated sulfuric acid utilized. It is preferred, however, that from about 1:1000 to 1:333 parts of metallic mercury based on the total weight of concentrated sulfuric acid be employed.

The diarylethane produced in accordance with the process of my invention may be catalytically decomposed in the vapor phase to yield nuclear-substituted styrenes, such as in the production of methylstyrene from 1,1-ditolylethane, and for the production of other compounds which are useful for various applications, such as molding articles, surface coatings, textile and paper treatment and the like. They are also useful as insecticides or as starting materials therefor, and for the production of wetting agents. In addition to 1,1-ditolylethane, various other diarylethanes may be synthesized according to the technique of the invention, such as any of the 1,1-dixylylethanes, 1,1-bis(isopropylphenyl)ethane, and the like.

It will be apparent that various modifications are possible within the scope of the invention and that the enumeration of specific details is not intended as a limitation of the invention, except as defined in the appended claims.

I claim:

1. In the process of synthesizing 1,1-diarylethanes wherein an acetylene component is reacted with an aromatic compound selected from the group consisting of mono- and di-alkyl substituted benzenes in the presence of a catalyst and wherein from about 15% to about 45% of the stoichiometric amount of acetylene required to react with all of said substituted benzene is employed, the improvement comprising effecting said synthesis in the presence of a sulfuric acid-colloidal metallic mercury catalyst system.

2. In the process of synthesizing 1,1-ditolylethane wherein an acetylene component is reacted with toluene in the presence of a sulfuric acid-mercury salt catalyst system and wherein from about 15% to about 45% of the stoichiometric amount of acetylene required to react with all of said toluene is employed, the improvement comprising effecting said synthesis in the presence of a sulfuric acid-colloidal metallic mercury catalyst system.

3. In the process of synthesizing 1,1-dixylylethane wherein an acetylene component is reacted with xylene in the presence of a sulfuric acid-mercury salt catalyst system and wherein from about 15% to about 45% of the stoichiometric amount of acetylene required to react with all of said xylene is employed, the improvement comprising effecting said synthesis in the presence of a sulfuric acid-colloidal metallic mercury catalyst system.

References Cited in the file of this patent

UNITED STATES PATENTS

| | | |
|---|---|---|
| 2,734,928 | Smolin | Feb. 14, 1956 |
| 2,802,038 | Prill | Aug. 6, 1957 |

OTHER REFERENCES

Ellis: Chemistry of Petroleum Derivatives (vol. 2), 1937, Reinhold Pub. Corp., N. Y. C. (pages 712 and 713 only relied on).

Brooks: Chemistry of the Non-Benzenoid Hydrocarbons, 2nd ed., 1950, Reinhold Pub. Corp., N. Y. C. (pages 470 and 483 only relied on).